United States Patent
Buchan

[15] 3,653,742
[45] Apr. 4, 1972

[54] ELECTRO-OPTIC VARIABLE FRESNEL ZONE PLATE

[72] Inventor: William R. Buchan, Lincoln, Mass.
[73] Assignee: Itek Corporation, Lexington, Mass.
[22] Filed: June 24, 1970
[21] Appl. No.: 53,768

[52] U.S. Cl. .................. 350/150, 350/160 R, 350/162 ZP
[51] Int. Cl. ........................................................ G02f 1/20
[58] Field of Search ................... 350/150, 162 ZP, 147, 157, 350/160

[56] References Cited

UNITED STATES PATENTS

| | | | |
|---|---|---|---|
| 2,983,824 | 5/1961 | Weeks et al. | 350/150 X |
| 3,402,001 | 9/1968 | Fleisher | 350/162 ZP |
| 3,499,703 | 3/1970 | De Bitetto | 350/162 ZP |
| 3,517,206 | 6/1970 | Oliver | 350/150 X |
| 3,566,130 | 2/1971 | Aldrich et al. | 350/150 X |

OTHER PUBLICATIONS

Fleisher et al., " Radiation Controlled Radiation Gate" IBM Tech. Discl. Bull. Vol. 6, No. 3 (Aug. 1963) pp. 73– 74

*Primary Examiner*—David Schonberg
*Assistant Examiner*—Paul R. Miller
*Attorney*—Homer O. Blair, Robert L. Nathans, David E. Brook and Joseph S. Iandiorio

[57] ABSTRACT

Apparatus is disclosed including a variable electro-optic Fresnel zone plate having an electro-optic medium with a characteristic that varies as a function of an applied electric field, means for applying to that medium an electric field whose intensity varies in a pattern of alternate high intensity and low intensity bands, and means for demodulating radiation modulated by that characteristic of the medium to produce a Fresnel zone plate pattern of radiation.

10 Claims, 1 Drawing Figure

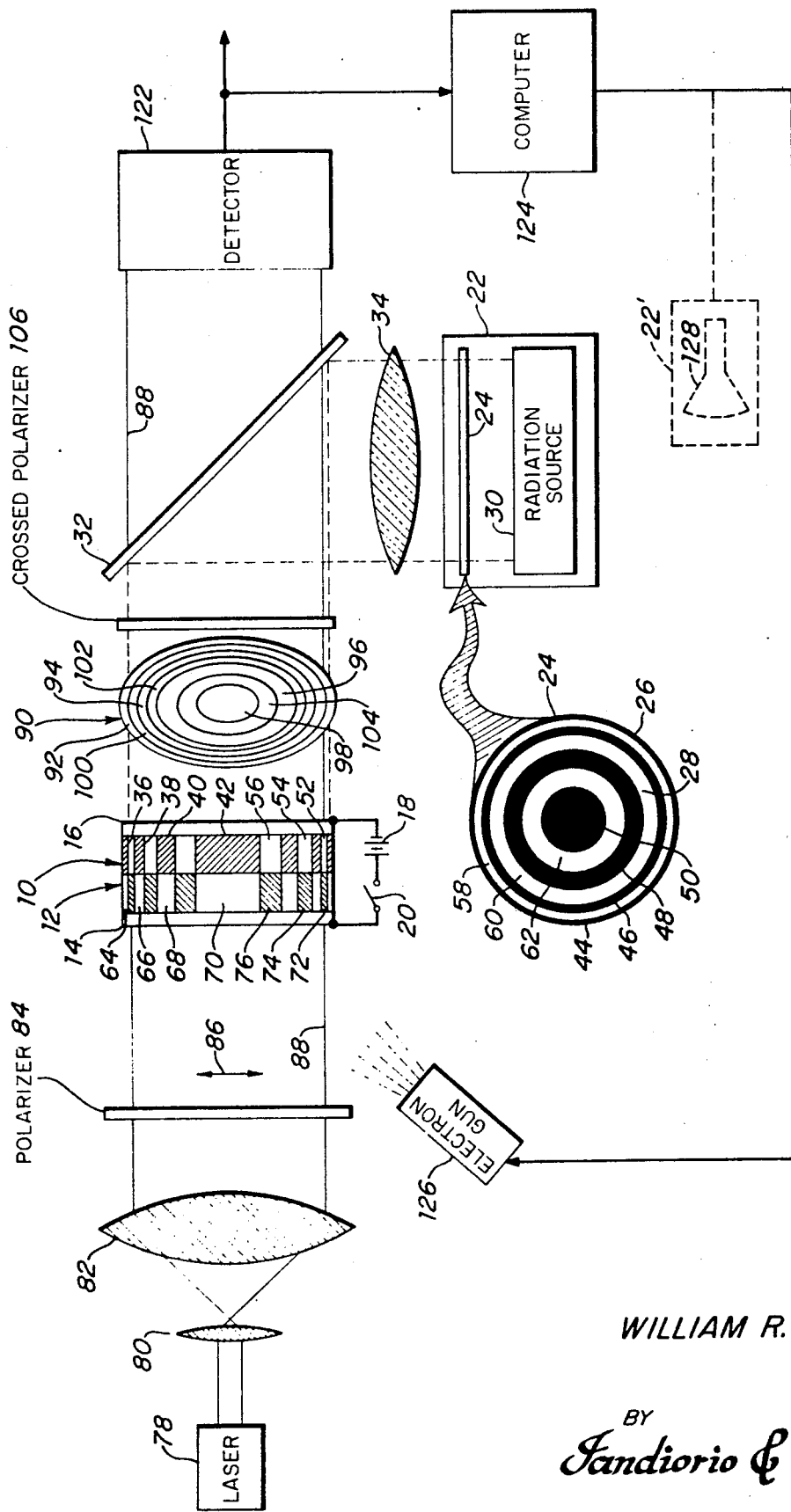

ELECTRO-OPTIC VARIABLE FRESNEL ZONE PLATE

CHARACTERIZATION OF INVENTION

The invention is characterized by a variable electro-optic Fresnel zone plate comprising an electro-optic medium having a characteristic that varies as a function of the intensity of an associated electric field, means for applying to that electro-optic medium an electric field whose intensity varies in a pattern of alternate high intensity and low intensity bands to vary the characteristic of the electro-optic medium in a pattern similar to a Fresnel zone plate, and means for demodulating radiation modulated by the characteristic of the electro-optic medium to produce a Fresnel zone plate pattern of radiation.

BACKGROUND OF INVENTION

This invention relates to Fresnel zone plates, and more particularly to electro-optic Fresnel zone plates whose characteristic bands can be varied in size and density to change the focal length of the plate.

It is advantageous to be able to vary the focal length of a Fresnel zone plate either as a final tolerance setting during the fabrication process or as a permanently available focal length adjustment capability. One approach to this has been to construct a Fresnel zone plate using a plurality of spaced concentric light shutters, such as of a material that exhibits electrically induced birefringence. By the use of polarizers the transmittance of such material may be controlled by variation of electric field intensity applied to it. Thus the opacity of each ring and some extent the areas between them may be varied to change the focal length of the zone plate by varying the electric field intensity applied to that ring. However, the relative size, position, and shapes of the rings are not variable and the amount of variation in focal length obtainable with such apparatus is of the order of ± 5 percent.

SUMMARY OF INVENTION

This it is desirable to have available a fully variable electro-optic Fresnel zone plate.

It is also desirable to have available a variable electro-optic Fresnel zone plate capable of varying the size, shape, opacity and position of its alternate dark and light bands.

It is also desirable to have available a variable electro-optic Fresnel zone plate capable of varying the Fresnel zone pattern in accordance with the intensity pattern of an applied electric field.

The invention may be accomplished by a variable electro-optic Fresnel zone plate which includes an electro-optic medium having a characteristic that varies as a function of the intensity of an associated electric field. The intensity of an applied electric field effective to produce the Fresnel pattern varies in a pattern of alternate high intensity and low intensity bands to vary the characteristic of the medium in a Fresnel pattern. Further, means are provided for demodulating radiation modulated by the characteristic of the electro-optic medium to produce a Fresnel zone pattern of radiation.

BRIEF DESCRIPTION OF THE DRAWING

The Drawing illustrates a variable electro-optic Fresnel zone plate of this invention.

DISCLOSURE OF PREFERRED EMBODIMENT

Other objects, features and advantages will occur from the following description of a preferred embodiment and the accompanying drawing, in which is shown a diagrammatic view of a system including an electro-optic variable Fresnel zone plate according to this invention.

The invention may be embodied in an optical system in which an electric field whose intensity varies in a pattern similar to the desired Fresnel pattern is applied to an electro-optic medium that exhibits the characteristic of electrically induced birefringence. The properly patterned electric field may be applied to the electro-optic medium by associating with it a photoconductor medium and placing the mediums between a pair of electrodes connected to a source of electrical energy. An image of the desired Fresnel zone pattern is projected on to the photoconductor medium so that its conductivity and thus the intensity of the electric field across it varies in a pattern similar to the density pattern of the incident image. Thus in portions of the photoconductor medium struck by high intensity image radiation the conductivity is high and the electric field across the photoconductor medium is low and in portions struck by low intensity radiation the conductivity is low and the electric field across the photoconductor medium is high. Therefore, the electric field is more intense across portions of the electro-optic medium proximate areas of the photoconductor medium struck by more intense radiation and is less intense across portions of the electro-optic medium proximate areas of the photoconductor medium struck by less intense radiation. In the portions of high electric field intensity the birefringence is more pronounced so that the radiation subject to those portions is elliptically polarized to a greater extent than is the radiation subject to the portions of the electro-optic medium experiencing lower electric field intensity. If the electro-optic medium is subjected to suitably oriented plane polarized radiation, then portions of that radiation subject to the electric field created by the dark or more dense bands of the image of the Fresnel pattern cast on the photoconductor medium are less elliptically polarized than the portions of that radiation subject to the electric field created by the light or less dense bands of the image of the Fresnel pattern cast on the photoconductor medium. Thus, if for example, the Fresnel pattern image were formed of concentric circular bands, the polarized radiation from the electro-optic medium would appear as alternate, annular bands of less and more elliptically polarized radiation. A crossed polarizer introduced into such pattern of polarized radiation produces a pattern of alternate, annular bands of more intense and less intense radiation: bands of more elliptically polarized radiation result in bands of higher intensity. radiation and bands of less elliptically polarized radiation result in bands of lower intensity radiation, just as produced by a conventional Fresnel zone plate.

The radiation modulated by the electro-optic medium may be transmitted by the medium, or may be reflected back through it. The radiation used to expose the photoconductor medium and that used to read out the electro-optic medium need not be visible light.

Serial as well as parallel readout may be performed by scanning the electro-optic medium with a beam of radiation. Similarly, the photoconductor medium may be exposed serially as well as in parallel and the photoconductor medium can be replaced by some other means for applying an electric field to the electro-optic medium such as a dielectric storage tape or a scanning electron beam.

If the electro-optic medium is as well an electric blocking layer, the source of electrical energy may be disconnected after the exposure of the photoconductor medium and the charges that migrated while the photoconductor medium was exposed will be trapped due to the blocking action of the electro-optic medium and the index of refraction variation pattern is fixed in the device. The device may be erased and reused by shorting the electrodes during a subsequent uniform exposure of the photoconductor medium. If the electro-optic medium is not also an electric blocking medium, the device functions only as a real time device, i.e., the electric field intensity pattern is present only while the image is present at the photoconductor medium.

The associated electric field read out by means of this invention may be due to a surface charge on the electro-optic medium, or be an internal electric field or an external electric field. Further, the field may be stored, as for example by persistent internal polarization, or may be momentary, as occurs when the device is used as a camera or image intensifier or converter.

Various other mediums and materials such as photoelectrets, ferroelectric materials, and others may be used along or in various combinations in this invention. Able to be used in this invention are devices having an electro-optic layer of e.g., KDP, DKDP, lithium niobate combined with a photoelectret layer of e.g., amorphous ZnS, ZnSe, ZnTe, CdS; or a device having a layer containing both an electro-optic and photoelectret medium, e.g., cubic (100) ZnS, ZnSe, ZnTe; combined with a blocking layer, e.g., polystyrene, $SiO_2$; or a device having a layer containing an electro-optic and a ferroelectric medium, e.g., bismuth titanate combined with a layer of an amorphous photoconductor and images presented as momentary electric fields provided by devices having a layer containing a photoconductor and electro-optic medium, e.g., CdS, KDP. The storage devices may be distinguished from the momentary or real time devices by presence of a blocking medium for preventing charge leakage to maintain the electric field for a substantial period of time. The blocking medium may be a separate dielectric layer or may be an electro-optic medium which also functions as a blocking layer.

One embodiment of the variable electro-optic Fresnel zone plate of this invention shown in the drawing employs a photoconductor layer 10 adjacent an electro-optic birefringent layer 12 between two electrodes 14, 16 energized by battery 18 through switch 20. A source 22 of an image of a Fresnel zone plate including a transparency 24 carrying an image of alternate, annular high density 26 and low density 28 bands as shown in the rotated view, is irradiated by a radiation source 30, and an image of transparency 24 is projected to photoconductor layer 10 via partially reflecting mirror 32 by lens 34. The annular portions 36, 38, 40 and center portion 42 of photoconductor layer 10 corresponding to the high density bands 44, 46, 48 and center area 50 of transparency 24, exhibit little increase in conductivity whereas the conductivity of annular portions 52, 54, 56 of layer 10 corresponding to low density bands 58, 60, 62 of transparency 24 are substantially increased. As a result the electric field intensity is lower and the birefringence less pronounced in annular sections 64, 66, 68 and center section 70 of electro-optic layer 12 and the electric field intensity is higher and the birefringence more pronounced in sections 72, 74, 76 of layer 12. Under these conditions the birefringent layer 12 is irradiated with plane polarized radiation such as may be derived from laser source 78 in conjunction with beam expander lenses 80, 82 and a polarizer element 84 which polarizes the radiation 88 as shown by arrow 86. The polarized radiation 88 passes through layer 12 where it becomes more elliptically polarized in sections 72, 74, 76, and less elliptically polarized in sections 64, 66, 68, 70. Thus, the radiation emerging from layer 10 and passing through mirror 32 has an elliptical polarization pattern as indicated at 90 in which the annular areas 92, 94, 96 and center area 98 exhibit little or no elliptical polarization and annular areas 100, 102, 104 exhibit greater elliptical polarization. The choice of wavelength of radiation 88 and frequency response of layer 10 is made so that the conductivity pattern of layer 10 is not disturbed by radiation 88. A crossed polarizer 106, arranged with its plane of polarization orthogonal to that of radiation 88, arrow 86, introduced into the path of radiation 88 filters out the component of radiation parallel to the arrow 86 and passes that component at right angles to arrow 86. Thus the linearly polarized radiation transmitted by crossed polarizer 106 emanates only from the annular Fresnel zones 72, 74, 76 of member 12 and exhibits the well known interference effects associated with Fresnel zone plates since a source of coherent radiation, laser 78, is used.

Even greater flexibility and faster response may be obtained by using the computer 124 directly to place a charge on the electro-optic layer 12 by means of an electron gun 126 for example. With that arrangement the photoconductor layer 10 is not used, for the variation in electric field intensity on layer 12 is produced directly on layer 12 by electron gun 126 in accordance with the determinations made by computer 124 for adjustment of the spacing, number, or width of bands in the Fresnel pattern. Similarly, flexibility and fast response may be obtained by substituting for source 22 a source 22' of an image of a fresnel pattern which uses a cathode ray tube 128 driven by computer 124 in response to detector 122.

Other embodiments will occur to those skilled in the art and are within the following claims.

What is claimed is:
1. An electro-optic storage device comprising:
    a. an electro-optic medium having a characteristic that varies as a function of the intensity of an associated electric field;
    b. means for applying to said electro-optic medium an electric field whose intensity varies in a pattern of alternate high intensity and low intensity bands to vary said characteristic of said electro-optic medium in a pattern similar to a Fresnel zone plate;
    c. electrical blocking means to prevent charge leakage thereby maintaining said electric field for a substantial period of time;
    d. means for demodulating radiation modulated by said characteristic of said electro-optic medium to produce a Fresnel zone plate pattern of radiation.
2. An electro-optic device of claim 1 in which said characteristic that varies as a function of the intensity of an associated electric field is electrically induced birefringence.
3. An electro-optic medium of claim 2 in which said means for applying an electric field includes a photoconductive medium associated with said electro-optic medium.
4. An electro-optic medium of claim 3 in which said means for applying an electric field includes a pair of electrodes with said mediums included between them and a means establishing an electric field across said electrodes.
5. An electro-optic medium of claim 4 in which said means for applying includes means for projecting onto said photoconductive medium an image whose intensity varies in a pattern of alternate high density and low density bands for producing a pattern of alternate high intensity and low intensity bands in the electric field.
6. An electro-optic medium of claim 5 in which said means of projecting includes means for delivering all portions of said image simultaneously for parallel read in of said image to said photoconductive medium.
7. An electro-optic medium of claim 6 in which said radiation modulated by said electro-optic medium is polarized radiation.
8. An electro-optic medium of claim 7 in which said means for demodulating includes a crossed polarizer.
9. An electro-optic medium of claim 7 in which said radiation modulated by said electro-optic medium is monochromatic.
10. A variable electro-optic Fresnel zone plate comprising:
    a. an electro-optic medium having a characteristic that varies as a function of the intensity of an associated electric field;
    b. electron gun means for applying to said electro-optic medium an electric field whose intensity varies in a pattern of alternate high intensity and low intensity bands to vary said characteristic of said electro-optic medium in a pattern similar to a Fresnel zone plate, said intensity pattern being generated by a digital computer; and,
    c. means for demodulating radiation modulated by said characteristic of said electro-optic medium to produce a Fresnel zone plate pattern of radiation.

* * * * *